No. 824,318. PATENTED JUNE 26, 1906.
T. THORP.
SPRING.
APPLICATION FILED DEC. 12, 1905.
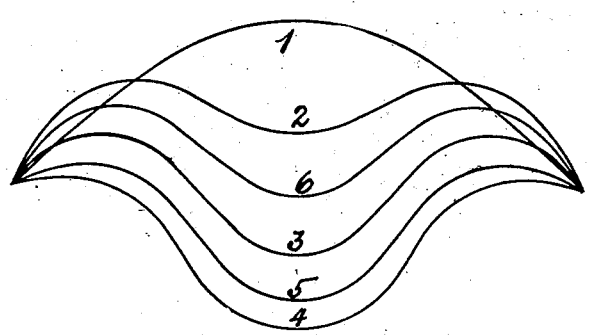
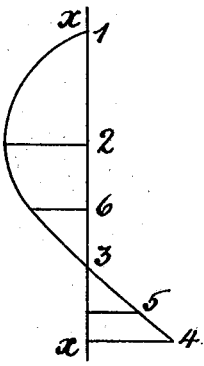
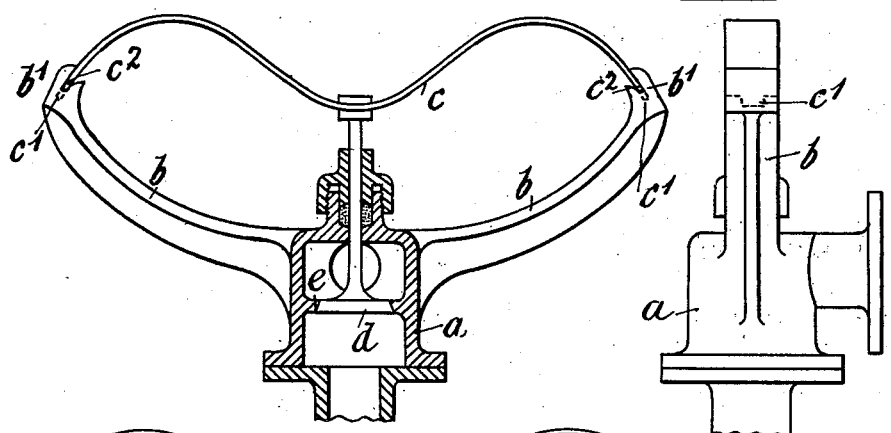
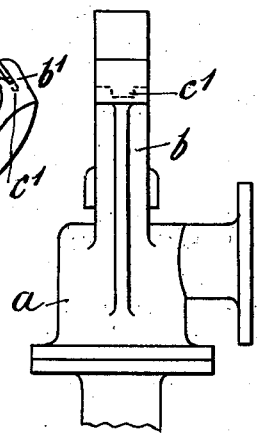
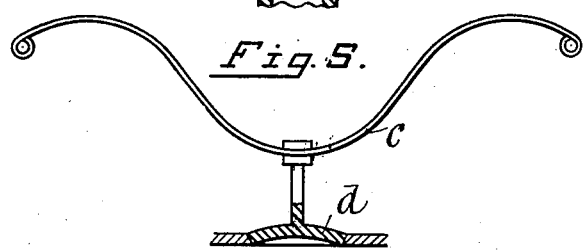
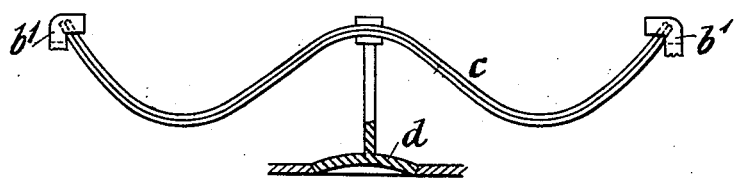
Witnesses:
RJ Downie
John A. Percival
Inventor
Thomas Thorp
BY Richard
ATTORNEYS

UNITED STATES PATENT OFFICE.

THOMAS THORP, OF WHITEFIELD, ENGLAND.

SPRING.

No. 824,318.　　　　　Specification of Letters Patent.　　　　Patented June 26, 1906.

Application filed December 12, 1905. Serial No. 291,500.

*To all whom it may concern:*

Be it known that I, THOMAS THORP, a subject of the King of Great Britain and Ireland, and a resident of Whitefield, in the county of Lancaster, England, have invented new and useful Improvements in Springs, of which the following is a specification.

The compression or tension of the springs hitherto used for loading valves, diaphragms, or other purposes is increased when the article acted on by the spring is moved in a direction contrary to that in which the spring acts and decreased when it is moved in the same direction. For instance, if a helical spring in compression is used to hold a valve closed by its direct pressure this pressure on the valve is increased when the valve lifts. In the same way when a valve is loaded by means of a lever the tension of the spring is increased by the lifting of the valve, or when the bell of a gas-antipulsator is supported by a spring the pull of the spring is decreased when the bell rises.

The present invention consists in the construction or arrangement of a spring which acts in the contrary way—that is to say, the pressure of which on a valve or other article decreases when the article acted on is moved in the opposite direction to that in which the spring acts—for instance, if a valve held closed by said spring lifts and increases when the article acted on is moved in the same direction—for instance, when a gas-bell suspended by this spring rises. This novel action of a spring is obtained by holding the ends of a spring-blade or of several such at the ends by suitable fixed abutments or their equivalents, the distance between which is less than the straight length of said blade or blades between its or their ends and deflecting it at the center to a curvature between the curvatures of the maximum pressures exerted by the spring contrary to and in the direction in which it is deflected.

On the drawings appended hereunto, Figure 1 shows the improved spring diagrammatically in several stages of deflection; and Fig. 2, a diagram of the corresponding pressures exerted by it.

A flat straight spring-blade placed between fixed or stationary abutments, the distance of which is less than the length of the spring-blade, will assume a curved form 1, varying according to the difference in the length of the spring-blade and the distance of the abutments. A difference which causes the camber of the spring to be about one-third of the distance between the abutments has been found suitable for practical purposes. If this spring is deflected by a load at the center, it will assume a corrugated form and exert a pressure in a contrary direction or upward in the case of the arrangement diagrammatically represented by Fig. 1, which pressure increases with the deflection till it has assumed the curvature 2, when the upward pressure is at its maximum, as shown by the experimentally-obtained diagram, Fig. 2, the abscissæ of which represent the deflections of the center of the spring, while the ordinates represent the corresponding pressures in the upward direction on the left of the axis $x\ x$ and in the downward direction on the right of the same. On being further deflected the upward pressure of the spring decreases, and when it has attained the curvature 3 it is in a neutral state, in which its entire elasticity is absorbed in internal strains and no upward or downward pressure is exerted by it. When still further deflected, the spring exerts a downward pressure, which arrives at its maximum when the spring has assumed the curvature 4 and then decreases again. Beyond the curvature 4, however, the spring has a tendency to jump over to a concave curvature, and the equilibrium between the two sides of the same becomes unstable, so that it cannot be practically used.

Preferably a straight blade is used; but moderately curved convex or corrugated springs may be used, more particularly when the curvatures beyond the neutral curvatures are not intended to be employed. If a spring of this kind, depressed to a curvature between the curvatures 2 and 3, such as 6, is made use of to exert an upward pressure against an article or surface subject to a downward pressure and the latter increases above the spring-pressure, the spring will yield and its pressure on the article or surface will decrease at the same time, contrary to the action of helical springs or curved blade-springs not held between fixed abutments or held between fixed abutments but only depressed to a curvature between the curvatures 1 and 2. In the same way a spring of this kind depressed to a curvature 5 between the curvatures 3 and 4 will exert a downward pressure which decreases as the center of the spring is pushed upward to the position 3. However, it will generally be found preferable to reverse the spring in such cases, bending it concave, in the first instance, and pressing it upward as the change in the pressure exerted by the curvatures between 3 and 4 takes place more rapidly than that exerted by the curvatures between 2 and 3. I have found by experiment that near to the neutral position the variations of the pressure exerted by this spring are very nearly proportional to the variations of its distance from this position, as shown by the diagram, Fig. 2, which has been drawn from experimentally-obtained data.

Springs made in the manner described may be used for various purposes in various ways—for instance, in circular gas-bellows to compensate the contracting force of the diaphragm forming the bellows when these are expended, for loading valves requiring a large lift, to compensate for the lift of the bell in gas-governors, to give uniform brake power in cams, and for analogous purposes.

In order fully to explain the application and action of the spring, some examples of their application will now be described.

On Figs. 3 and 4 the application of a spring of this kind to an inverted discharge-valve is shown as an example. The valve-casing $a$ is formed with two horns $b$, which are slotted in the middle and have angular shoulders $b'$, and the spring-blade $c$ has tongues $c'$ at each end which enter into the recesses, while the rounded ends $c^2$ of the blade at the side of the tongues rest in the angles of the shoulders. The spring-blade is bent down till it assumes the curvature 6, (shown on Fig. 1,) and connected to the stem of the valve $d$, which it holds upon its seating $e$ against the fluid-pressure above. When this exceeds the pressure exerted by the spring upon the valve, the latter will open and move downward, while at the same time the pressure of the spring upon it is reduced, so that a large free lift of the valve is obtained. If the same arrangement of spring is used partly to support a gas-holder bell suspended from it, its upward pressure will be increased when the bell rises, and the increase in the weight caused by the rise of the bell out of the seating liquid can thus be compensated and an equal gas-pressure obtained for all positions of the bell.

Fig. 5 indicates the use of a spring of this kind bent to the curvature 5 of Fig. 1 for holding a valve down. For the reasons stated above, however, it is generally preferable to employ for this purpose a spring of the curvature 6, Fig. 1, reversed, as indicated on Fig. 6.

The spring may consist of a single blade or of several such blades placed on the top of each other, as shown on Fig. 6, or blades crossing each other at equal angles and connected to each other at the center may be used. The blades may be of uniform width or they may be wider at the middle than at the ends or narrower at the middle than at the ends, as may be most suitable for the purpose for which the spring is to be used. It may of course be formed with ends bent over to form eyes, as shown on Fig. 5, and fixed to the abutments by pins passed through them and the eyes.

I claim as my invention—

1. The combination with two fixed abutments of a spring-blade the distance between the ends of which is greater than that between the abutments and which is confined by said abutments and means for connecting the object to be acted on by the spring to the center thereof whereby said spring will be deflected to a curvature lying between the curvature of maximum pressure and the neutral curvature substantially as and for the purpose set forth.

2. The combination with two fixed abutments of a flat spring-blade of greater length than the distance between said abutments which is confined by said abutments so as to assume a convex shape and means for connecting the object to be acted on by the spring to the center thereof whereby said spring will be deflected at its center and assume a corrugated curvature lying between the curvatures of maximum pressure in either direction substantially as and for the purpose set forth.

3. The combination with two fixed abutments of a spring-blade the ends of which are farther apart than said abutments and are confined by them, which blade is deflected at its center until it has assumed a corrugated curvature lying between the curvatures of maximum pressure in either direction, and an object to be acted upon by said spring-rod said article being connected to the center of the spring.

In testimony whereof I have hereunto set my hand in the presence of two witnesses.

THOMAS THORP.

Witnesses:
CARL BOLLÉ,
RIDLEY G. URQUHART.